United States Patent
Liu et al.

(10) Patent No.: US 11,072,045 B2
(45) Date of Patent: Jul. 27, 2021

(54) METHOD AND STRUCTURE FOR COMPENSATING TOLERANCES IN ASSEMBLING MODULES

(71) Applicant: TOPRAY MEMS INC., Hsinchu (TW)

(72) Inventors: Chin-Sung Liu, Hsinchu (TW);
Shin-Ter Tsai, Hsinchu (TW);
Tsung-Min Yang, Hsinchu (TW);
Tsung-Hung Wu, Hsinchu (TW);
Ming-Yan Lin, Hsinchu (TW);
Chi-Ling Chang, Hsinchu (TW)

(73) Assignee: TOPRAY MEMS INC., Hsinchu (TW)

( * ) Notice: Subject to any disclaimer, the term of this patent is extended or adjusted under 35 U.S.C. 154(b) by 24 days.

(21) Appl. No.: 16/780,003

(22) Filed: Feb. 3, 2020

(65) Prior Publication Data
US 2021/0197327 A1 Jul. 1, 2021

(30) Foreign Application Priority Data
Dec. 27, 2019 (TW) ................................. 108148236

(51) Int. Cl.
*B23P 19/04* (2006.01)

(52) U.S. Cl.
CPC ................................. *B23P 19/04* (2013.01)

(58) Field of Classification Search
CPC ................................. B23P 19/04; B23P 19/10
See application file for complete search history.

(56) References Cited

U.S. PATENT DOCUMENTS

| | | | | |
|---|---|---|---|---|
| 3,252,212 A * | 5/1966 | Bell, III | ................ | F01D 5/142 29/407.08 |
| 4,054,999 A * | 10/1977 | Harbottle | ............. | F16C 19/364 29/898.07 |
| 4,150,468 A * | 4/1979 | Harbottle | ............. | F16C 19/364 29/898.09 |
| 4,214,465 A * | 7/1980 | Rode | ..................... | B23P 19/04 100/257 |
| 6,431,134 B1 * | 8/2002 | Hass | ....................... | F01L 1/46 123/90.39 |
| 6,461,051 B1 * | 10/2002 | Rode | .................... | F16C 25/083 29/898.062 |
| 7,251,892 B2 * | 8/2007 | Strait | ................... | F16C 19/548 29/898.09 |

(Continued)

*Primary Examiner* — Bayan Salone
(74) *Attorney, Agent, or Firm* — Lin & Associates Intellectual Property, Inc.

(57) ABSTRACT

A method and structure for compensating tolerances in assembling modules are provided. The method applies to a pressing fixture and a module with a baseline reference plane and an assembly baseline plane. The assembly baseline plane has at least three compensation baseline bumps, having the height greater than the compensation amount. The pressing fixture has a calibration reference plane. The method comprises: adjusting the position of the module or the pressing fixture to make the baseline reference plane parallel to the calibration reference plane; the pressing fixture using the calibration reference plane to press on the compensation baseline bumps, and changing the position of bump top of each compensation baseline bump; removing the pressing fixture from the compensation baseline bumps, and the plurality of the bump tops forming a preliminary baseline plane, and the preliminary baseline plane being parallel to the baseline reference plane.

8 Claims, 15 Drawing Sheets

(56) References Cited

U.S. PATENT DOCUMENTS 7,346,985 B1 *  3/2008  Strait .................. F16C 19/548
                                                  29/898.09
9,168,619 B2 *  10/2015  Goggin .............. F16K 37/0075

* cited by examiner

METHOD AND STRUCTURE FOR COMPENSATING TOLERANCES IN ASSEMBLING MODULES

CROSS-REFERENCE TO RELATED APPLICATION

This application claims the priority of Taiwanese patent application No. 108148236, filed on Dec. 27, 2019, which is incorporated herewith by reference.

BACKGROUND OF THE INVENTION

1. Field of the Invention

The present invention relates generally to a method and structure for compensating tolerances in assembling modules, and more particularly, to adjusting tolerances generated after the assembly of modular products to maintain the accuracy of subsequent component assembly.

2. The Prior Arts

With the change and progress of the technologies, the camera function of the mobile phones gradually replaced the traditional camera market. In addition, as mobile phones are becoming thinner and thinner, the requirements for image quality are becoming higher and higher, which inevitably increases the difficulty of designing and manufacturing mobile phone camera modules, especially the demand on the precision such as the relative inclination and distance between the lens and the image sensing element. Traditional assembly production methods relying on mechanical positioning have become unable to meet the needs of the high-end imaging market. Therefore, six-axis active adjustment machines have appeared on the market to provide adjusting related parameters. However, such equipment is high in costs and low in production efficiency. In view of this, the present inventors aim to provide an improved method.

SUMMARY OF THE INVENTION

To solve the aforementioned problems, a primary objective of the present invention is to provide a method and structure for compensating tolerances in assembling module. The modules can be a semi-finished product or a finished product of a camera module, by forming a reference plane generated through compensation and calibration on the module for subsequent component assembly, the present invention can meet the requirements of precision assembly.

For achieving the foregoing objectives, the present invention provides a method for compensating tolerances in assembling modules. The method applies to a pressing fixture and a module with a baseline reference plane and an assembly baseline plane. The assembly baseline plane has at least three compensation baseline bumps, having the height greater than an compensation amount. The pressing fixture has a calibration reference plane. The method comprises: adjusting the position of the module or the pressing fixture to make the baseline reference plane parallel to the calibration reference plane; the pressing fixture using the calibration reference plane to press on the compensation baseline bumps, and changing the position of bump top of each compensation baseline bump; removing the pressing fixture from the compensation baseline bumps, and the plurality of the bump tops forming a preliminary baseline plane, and the preliminary baseline plane being parallel to the baseline reference plane with a preset distance in-between.

The present invention also provides a structure for compensating tolerances in assembling modules, the module having a baseline reference plane and an assembly baseline plane, the assembly baseline plane having at least three compensation baseline bumps, each compensation baseline bump having a bump top and the plurality of the bump tops forming a preliminary baseline plane, and the preliminary baseline plane being parallel to the baseline reference plane with a set distance in-between.

According to a preferred embodiment of the present invention, the compensation amount is an offset angle and a distance between the baseline reference plane and the assembly baseline plane.

According to a preferred embodiment of the present invention, the method further comprises a step of measuring an inclination angle or distance between the baseline reference plane and the calibration reference plane, and the timing for measurement is before adjusting the baseline reference plane and the calibration reference plane, or before pressing the calibration reference plane is pressed against the compensation baseline bump.

According to a preferred embodiment of the present invention, the compensation baseline bump is formed on the assembly baseline plane by way of dispensing glue, and the bump top of the compensation baseline bump that has not yet solidified is changed during the pressing process, and then the glue is cured.

According to a preferred embodiment of the present invention, the glue will only be fixed to the assembly baseline plane after curing and will not be fixed to the pressing fixture.

According to a preferred embodiment of the present invention, the compensation baseline bump is directly formed on the assembly baseline plane, and the pressing fixture is an ultrasonic pressurizing device or a hot press forming device; during the pressing process, the position of the bump top of each of the compensation baseline bumps is changed in an ultrasonic or hot pressing manner.

According to a preferred embodiment of the present invention, the plurality of the compensation baseline bumps is evenly distributed on the assembly baseline plane.

The present invention has the following specific effects:
1. The calibrated preliminary baseline plane of the present invention accurately corresponds to the baseline reference plane, which is the core baseline plane of key materials, so that the accuracy of subsequent assembly with other components can be maintained;
2. The operation machine applied to the method of the present invention has low equipment cost and is convenient to use, which helps the operator to complete the accurate calibration of the camera module in a fast and convenient manner;
3. The convenience of the present invention can be widely applied to the calibration and tolerance compensation of various components in a camera module to improve the production efficiency of a product.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 1:
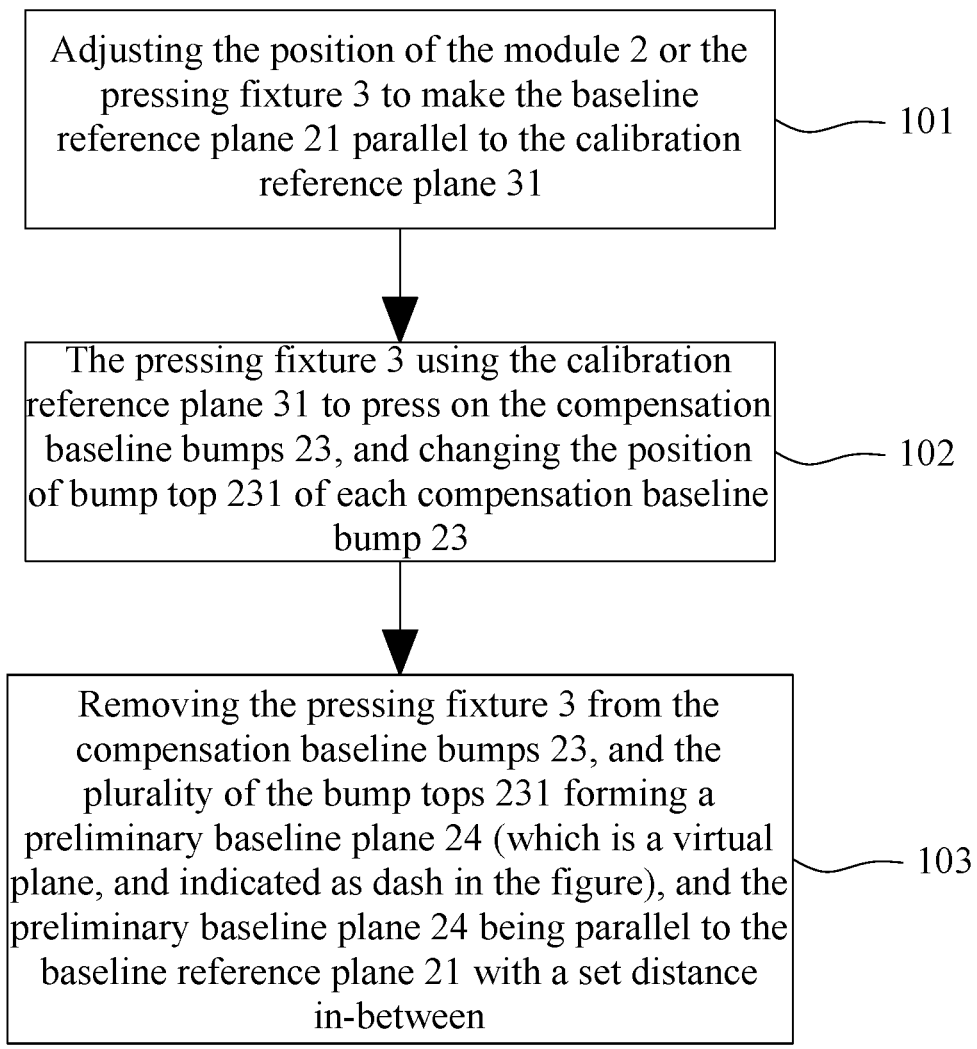
FIG. 1 is a flowchart of a method for compensating tolerances in assembling modules of the present invention.
Figure 2A:
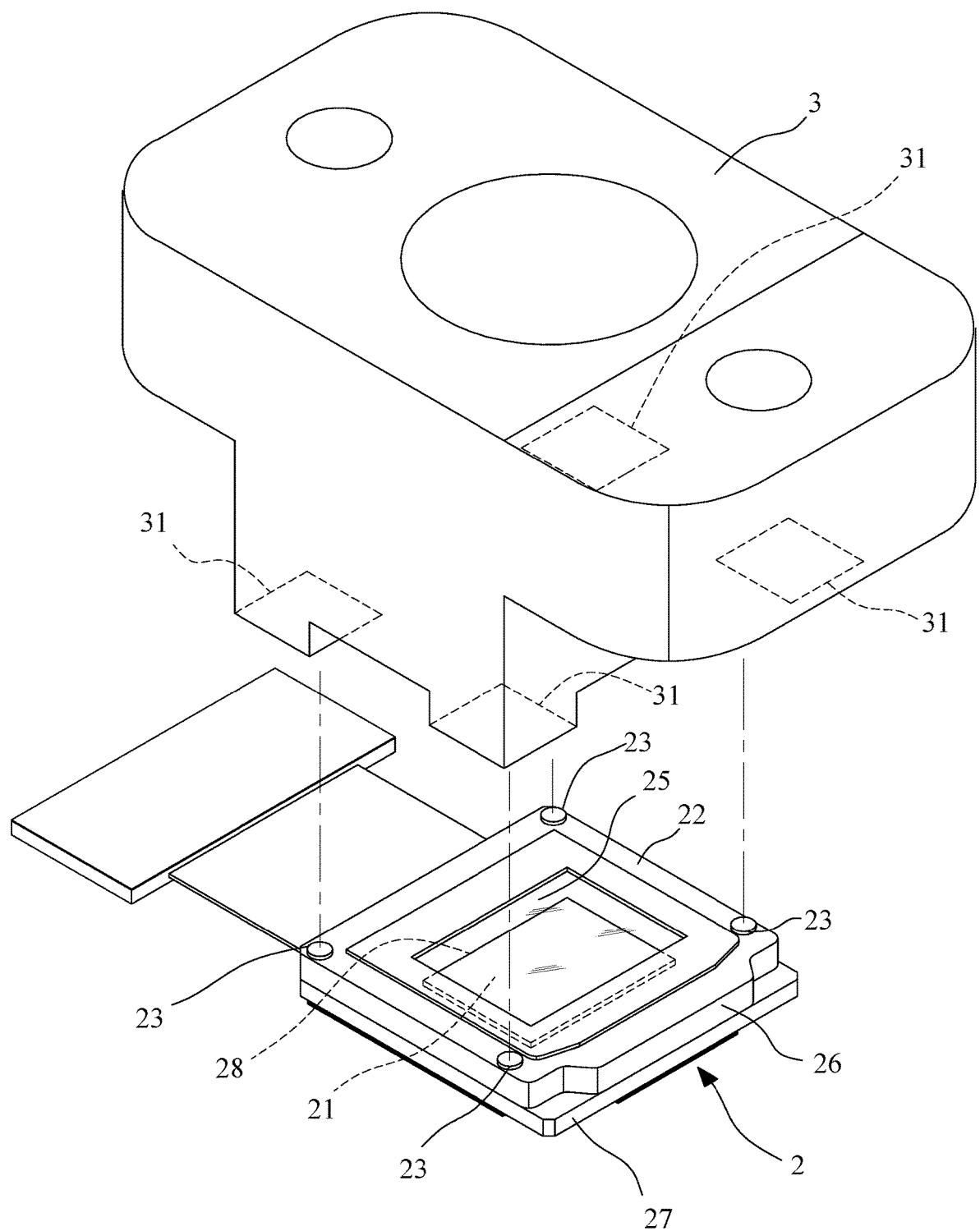
FIG. 2A is a first schematic view of the operation of the method of the present invention.

FIG. 1 is a flowchart of a method for compensating tolerances in assembling modules of the present invention. As shown in FIG. 2A, the method of the present invention is applicable to a pressing fixture 3 and a module 2. The module 2 can be a camera module, and the details would be described later. The module 2 has a baseline reference plane 21 and an assembly baseline plane 22. The assembly baseline plane 22 has at least three compensation baseline bumps 23. The height of the compensation baseline bumps 23 is greater than a compensation amount. The pressing fixture 3 has at least a calibration reference plane 31. The method for compensating tolerances in assembling modules comprises:

Step 101: adjusting the position of the module 2 or the pressing fixture 3 to make the baseline reference plane 21 parallel to the calibration reference plane 31; as shown in FIG. 2A.

Figure 2B:
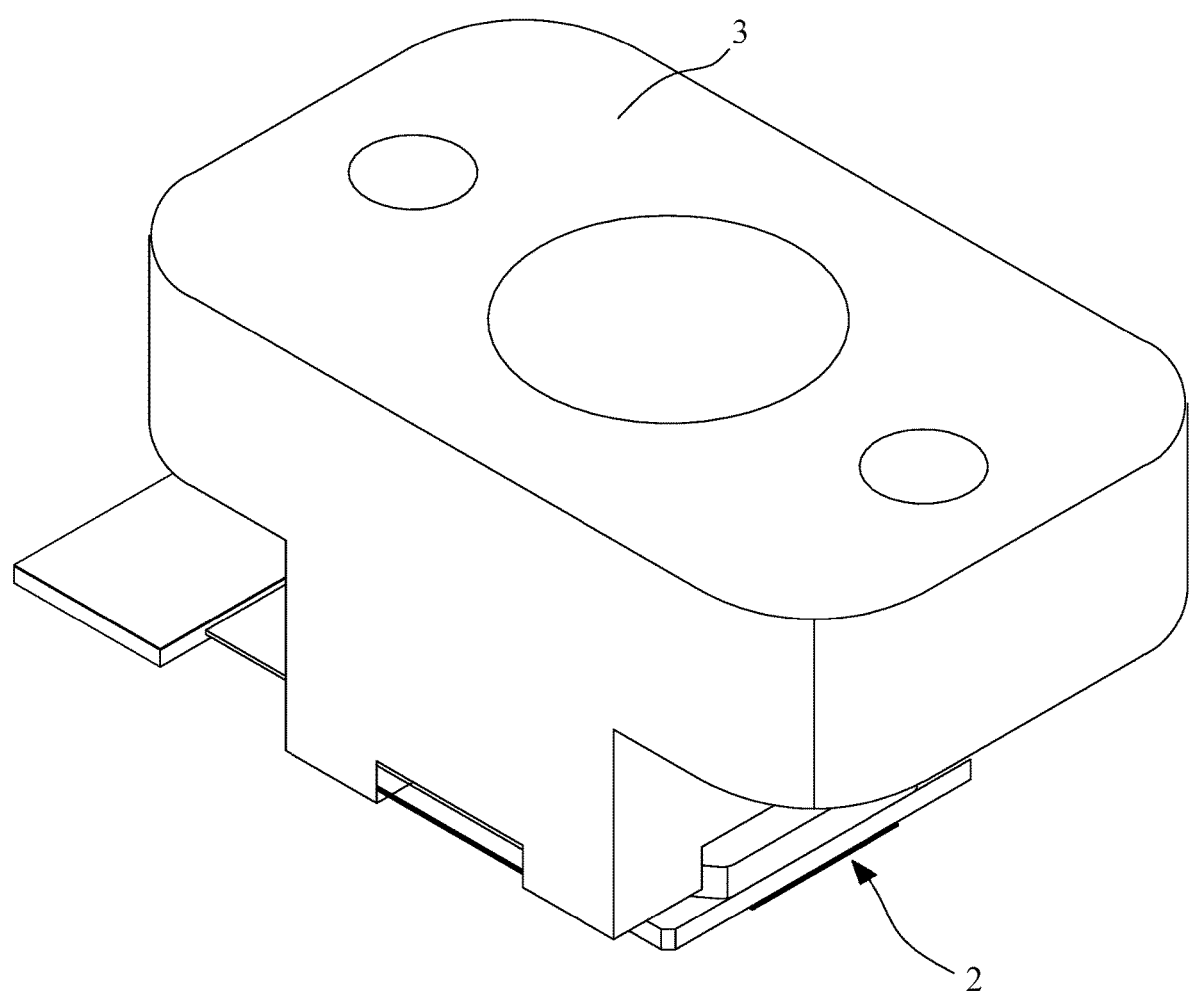
FIG. 2B is a second schematic view of the operation of the method of the present invention.

Step 102: the pressing fixture 3 using the calibration reference plane 31 to press on the compensation baseline bumps 23, and changing the position of bump top 231 of each compensation baseline bump 23; as shown in FIG. 2B.

Figure 2C:
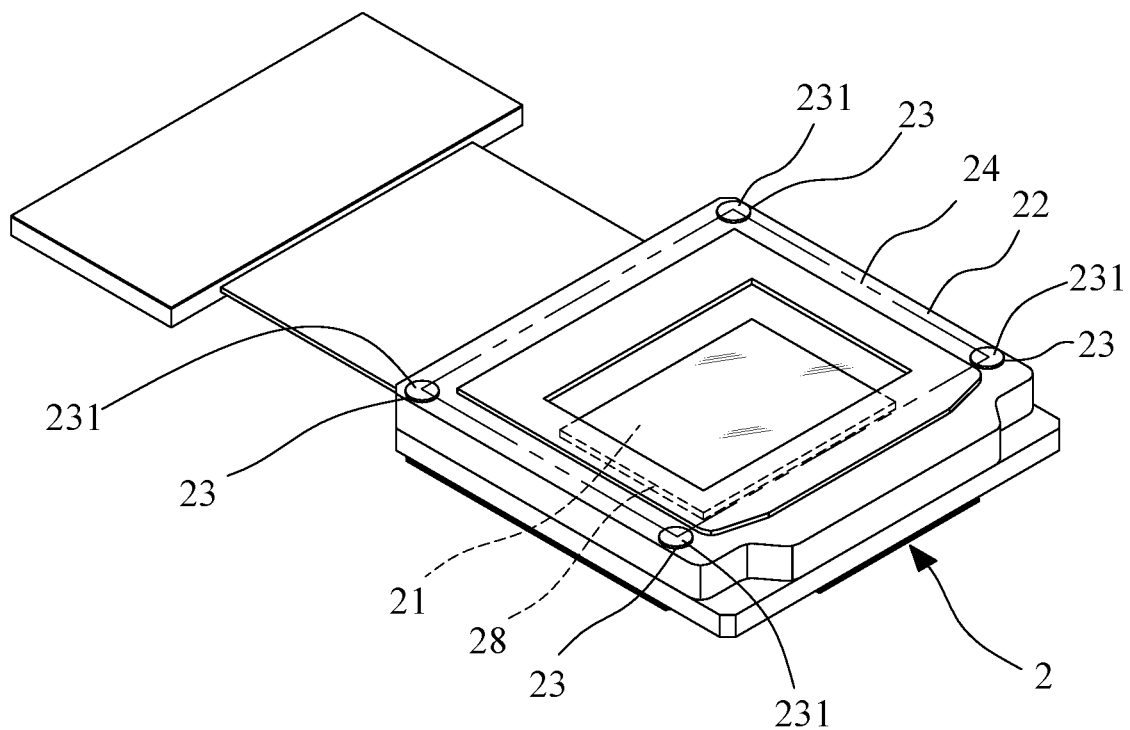
FIG. 2C is a third schematic view of the operation of the method of the present invention.

Step 103: removing the pressing fixture 3 from the compensation baseline bumps 23, and the plurality of the bump tops 231 forming a preliminary baseline plane 24 (which is a virtual plane, and indicated as dash in the figure), and the preliminary baseline plane 24 being parallel to the baseline reference plane 21 with a preset distance in-between, as shown in FIG. 2C.

The following describes the details of the method with an actual product. As shown in FIG. 2A, the module 2 is a semi-finished product of a camera module, including a filter 25, a bracket 26, a circuit board 27, and an image sensing chip 28. The image sensing chip 28 is disposed on the circuit board 27. The filter 25 is disposed in a central region of the bracket 26. The bracket 26 is fixed on the circuit board 27 so that the filter 25 faces the image sensing chip 28. In the present embodiment, the baseline reference plane 21 is the top plane of the image sensing chip 28, and the assembly baseline plane 22 is a plane surrounding the filter 25 on the top plane of the bracket 26. Because each component basically has allowable tolerances, after the components are assembled, the multiple tolerances affect one another, which may cause an improper inclination or offset height between the assembly baseline plane 22 and the baseline reference plane 21. Direct assembly with other components in subsequent assembly process using this assembly baseline plane 22 will increase the amount of deviation and affect product accuracy.

The method for compensating tolerances in assembling modules of the present invention can solve this problem. As shown in FIG. 2C, the tolerance compensation structure resulted from following the method of the present invention is provided with at least three compensation baseline bumps 23 on the assembly baseline plane 22. The compensation baseline bumps 23 change the height of the bump tops 231 of the compensation baseline bumps 23 after being calibrated and compensated, and the plurality of bump tops 231 constitute a preliminary baseline plane 24. Since the preliminary baseline plane 24 and the baseline reference plane 21 on the key component (such as the image sensing chip 28) are parallel and the height is correct, so it can ensure the accuracy of subsequent assembly with other components, such as maintaining the consistency of the optical axis of the camera module, and thus maintaining the accuracy required by the camera module.

Figure 3:
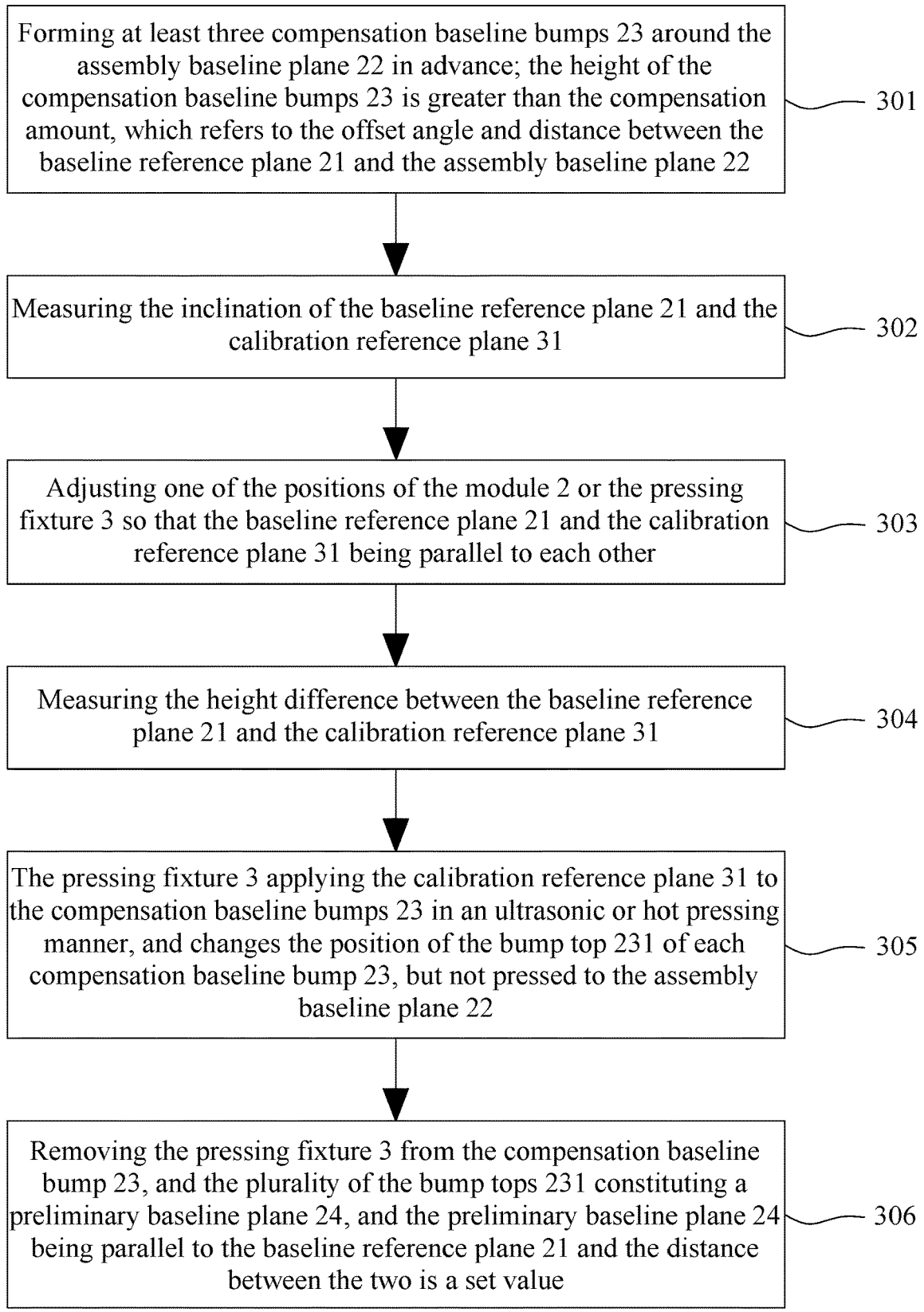
FIG. 3 is a detailed flowchart of the material-subtraction compensation of the method of the present invention.

In the above method and structure, according to the manner in which the compensation baseline bump 23 is formed on the assembly baseline plane 22, the present invention can be further divided into the following two ways:

I. Material-subtraction compensation method: This method is to form the compensation reference bumps 23 directly on the assembly baseline plane 22 when the module 2 is formed, and use hot pressing or ultrasonic processing technology to change the position of the top of the compensation baseline bump 23. In this embodiment, the pressing fixture 3 may be an ultrasonic pressing device or a hot press forming device. As shown in FIG. 3, a detailed flowchart of the method in accordance with the present invention is presented. The architecture also refers to FIGS. 2A to 2C. The steps are as follows:

Step 301: forming at least three compensation baseline bumps 23 around the assembly baseline plane 22 in advance; the height of the compensation baseline bumps 23 is greater than the compensation amount, which refers to the offset angle and distance between the baseline reference plane 21 and the assembly baseline plane 22;

Step 302: measuring the inclination of the baseline reference plane 21 and the calibration reference plane 31. Since the filter 25 is a transparent glass capable of filtering infrared rays in the present embodiment, there is no difficulty in measuring the inclination of the calibration reference plane 31 and the baseline reference plane 21;

Step 303: adjusting one of the positions of the module 2 or the pressing fixture 3 so that the baseline reference plane 21 and the calibration reference plane 31 being parallel to each other;

Step 304: measuring the height difference between the baseline reference plane 21 and the calibration reference plane 31;

Step 305: the pressing fixture 3 applying the calibration reference plane 31 to the compensation baseline bumps 23 in an ultrasonic or hot pressing manner, and changes the position of the bump top 231 of each compensation baseline bump 23, but not pressed to the assembly baseline plane 22;

Step 306: removing the pressing fixture 3 from the compensation baseline bump 23, and the plurality of the bump tops 231 constituting a preliminary baseline plane 24, and the preliminary baseline plane 24 being parallel to the baseline reference plane 21 and the distance between the two is a set value.

Figure 4:
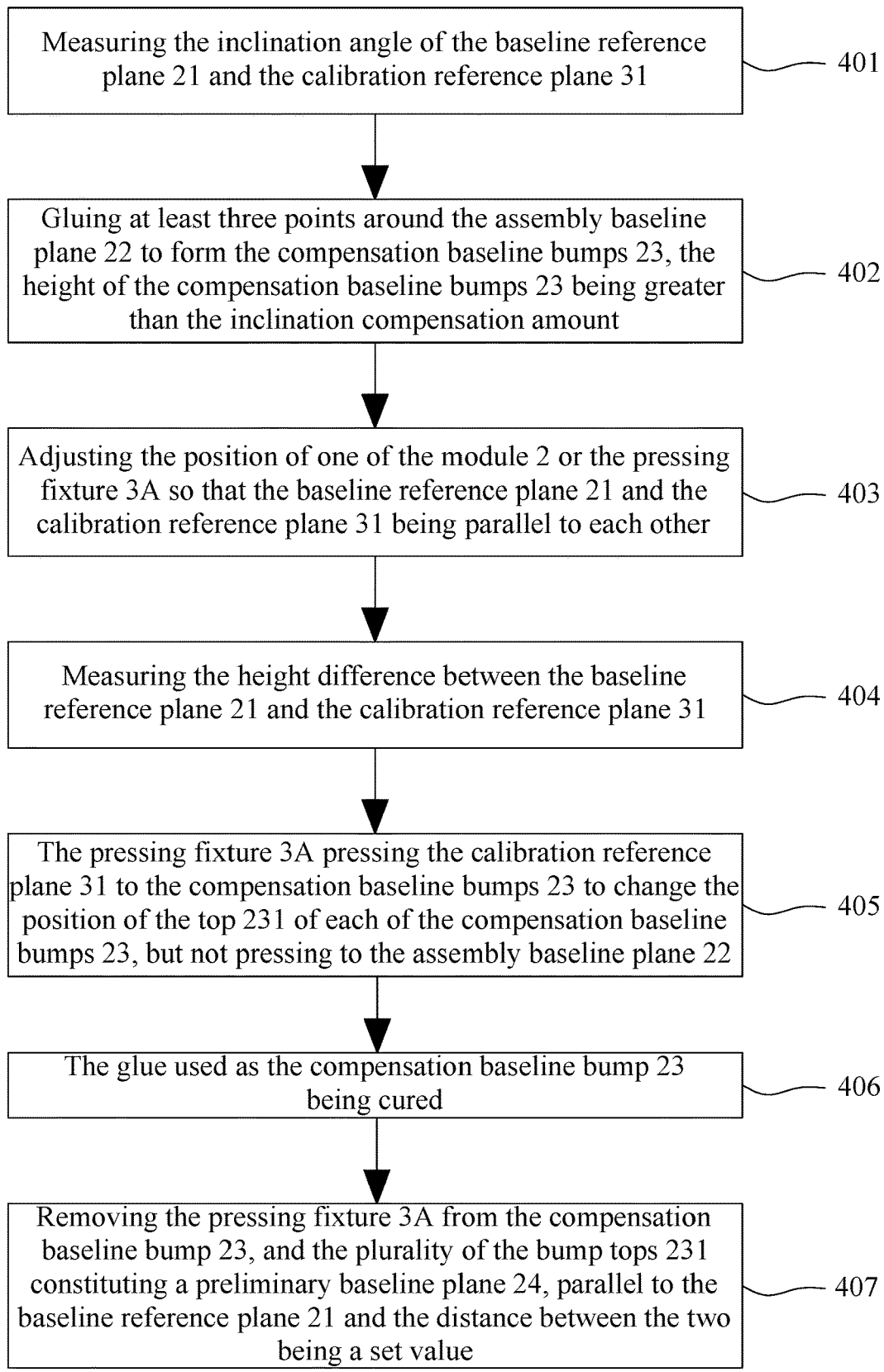
FIG. 4 is a detailed flowchart of the material-addition of the method of the present invention.

II. Material-addition method: the compensation based bump 23 is to add glue on the assembly baseline plane 22, and then the pressing fixture 3A is lowered before the glue is solidified to adjust the position of the bump top 231 of the compensation baseline bumps 23. In this embodiment, the glue can be a light-curing glue, and the pressing fixture 3A needs to be equipped with a light-curing device, but it is not limited thereto. As shown in FIG. 4 as well as FIG. 5A to FIG. 5C, a detailed flowchart of steps formed with the method of the present invention.

Figure 5A:
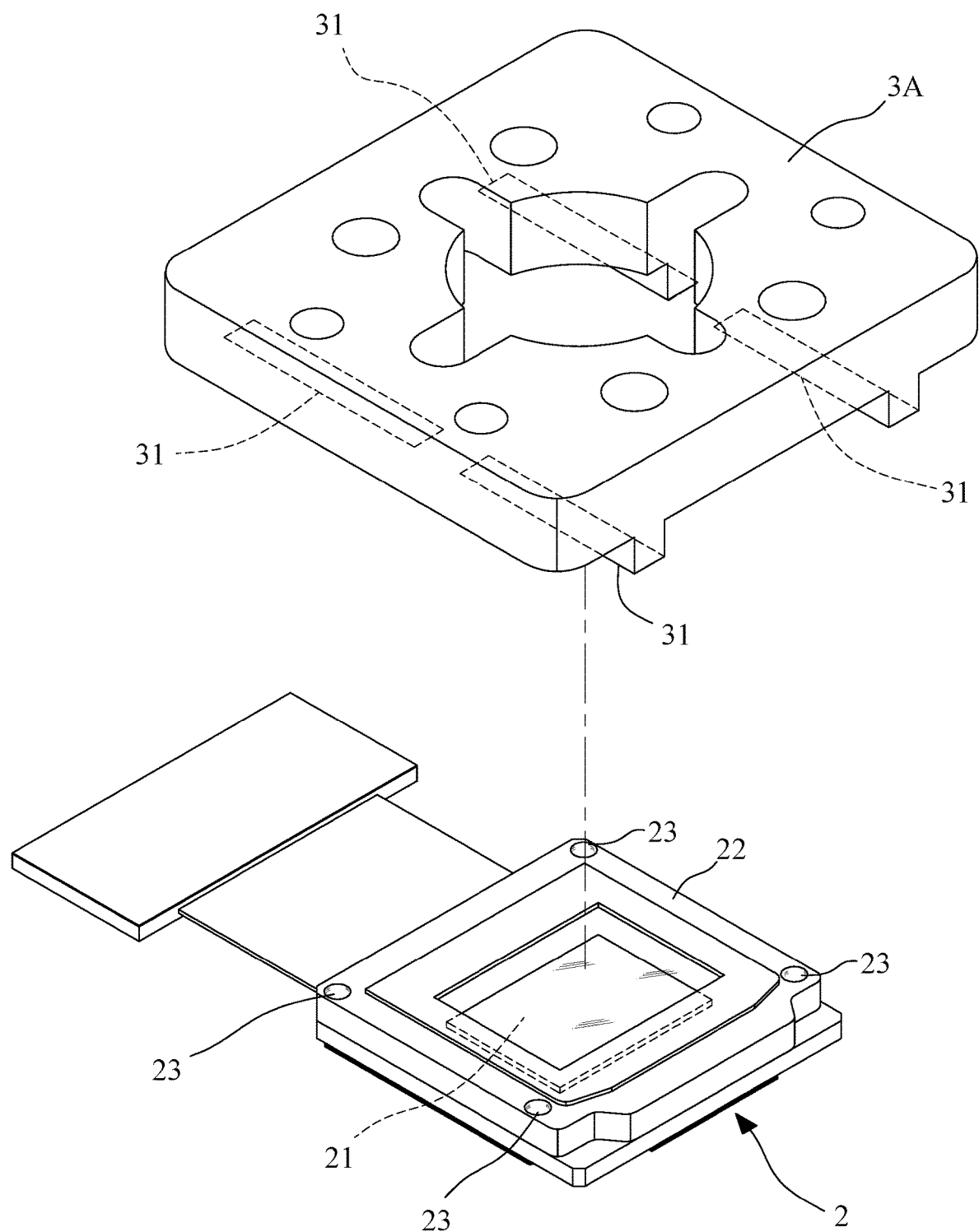
FIG. 5A is a first schematic view of the operation of the method in FIG. 4.
Figure 5B:
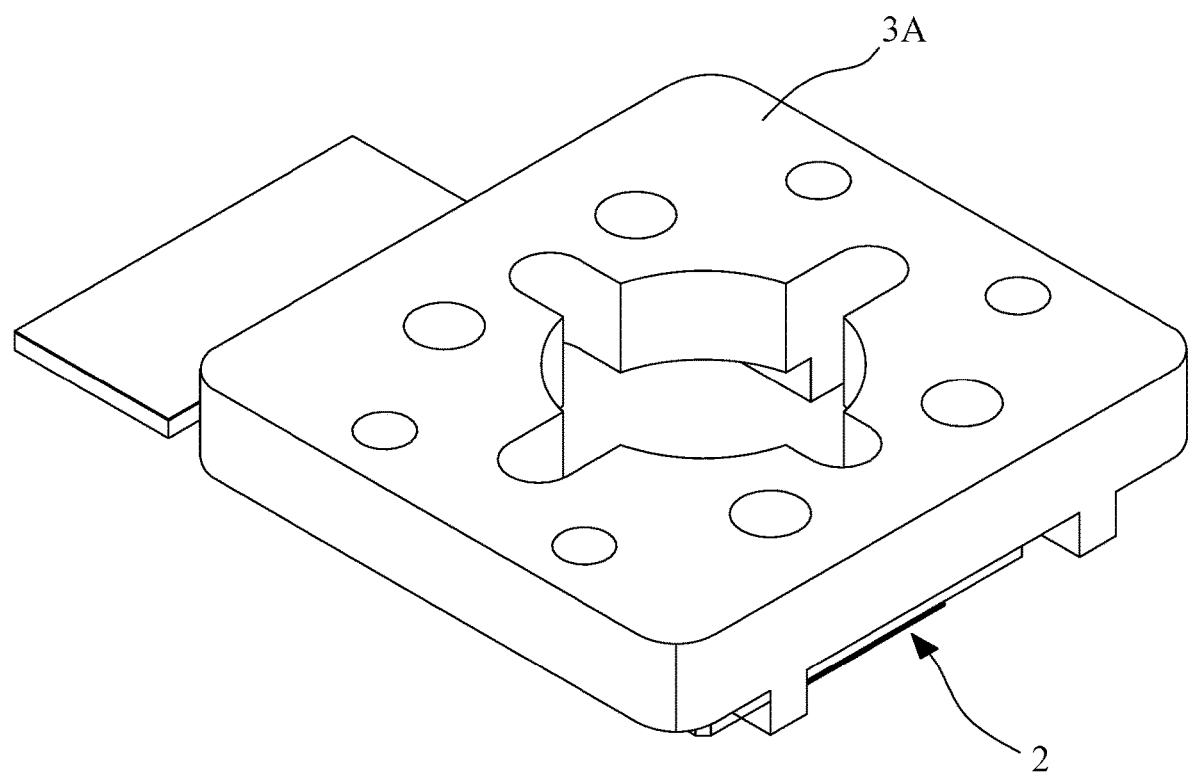
FIG. 5B is a second schematic view of the operation of the method in FIG. 4.
Figure 5C:
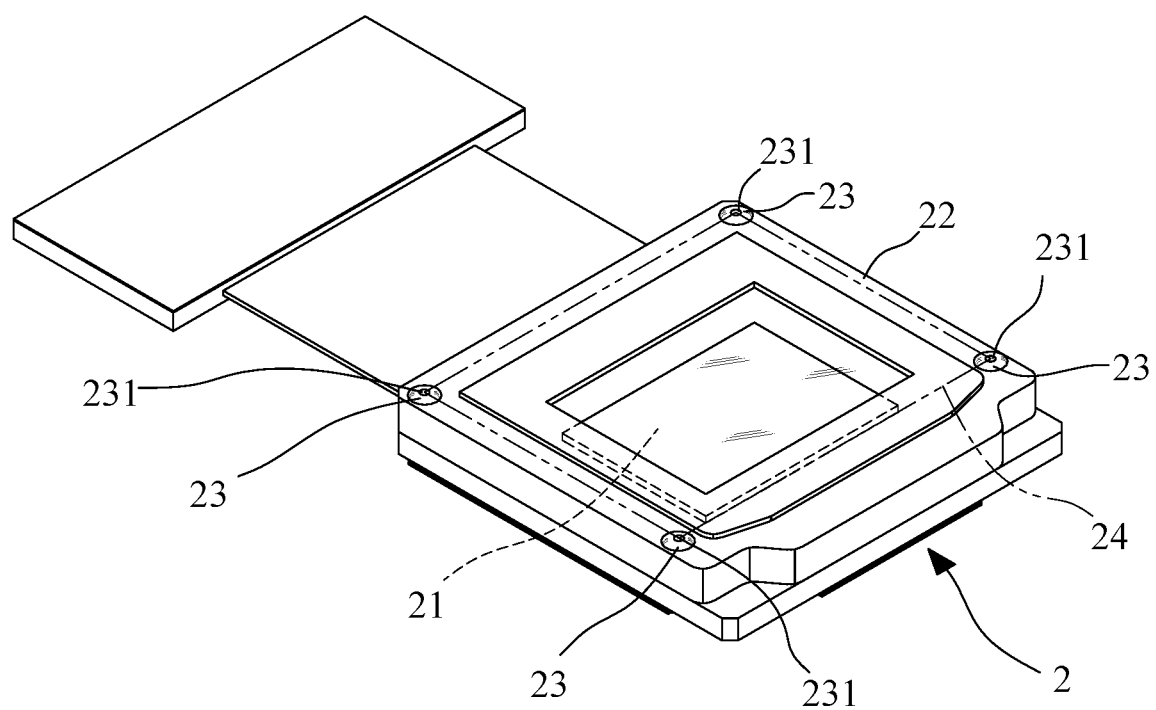
FIG. 5C is a third schematic view of the operation of the method in FIG. 4.

Step 401: measuring the inclination angle of the baseline reference plane 21 and the calibration reference plane 31;

Step 402: gluing at least three points around the assembly baseline plane 22 to form the compensation baseline bumps 23, the height of the compensation baseline bumps 23 being greater than the inclination and height compensation amount, as shown in FIG. 5A;

Step 403: adjusting the position of one of the module 2 or the pressing fixture 3A so that the baseline reference plane 21 and the calibration reference plane 31 being parallel to each other;

Step 404: measuring the height difference between the baseline reference plane 21 and the calibration reference plane 31;

Step 405: the pressing fixture 3A pressing the calibration reference plane 31 to the compensation baseline bumps 23 to change the position of the top 231 of each of the compensation baseline bumps 23, but not pressing to the assembly baseline plane 22, as shown in FIG. 5B;

Step 406: the glue used as the compensation baseline bump 23 being cured; the glue selected must be a material cured only on the assembly baseline surface 22, but not on the calibration reference plane 31 of the pressing fixture 3A;

Step 407: removing the pressing fixture 3A from the compensation baseline bump 23, and the plurality of the bump tops 231 constituting a preliminary baseline plane 24, parallel to the baseline reference plane 21 and the distance between the two being a set value.

The material-addition method is more convenient in processing. After measuring the inclination angle and then dispensing the glue, the glue amount and height can be accurately controlled, thereby reducing the height of the compensation reference bump 23.

Figure 6:
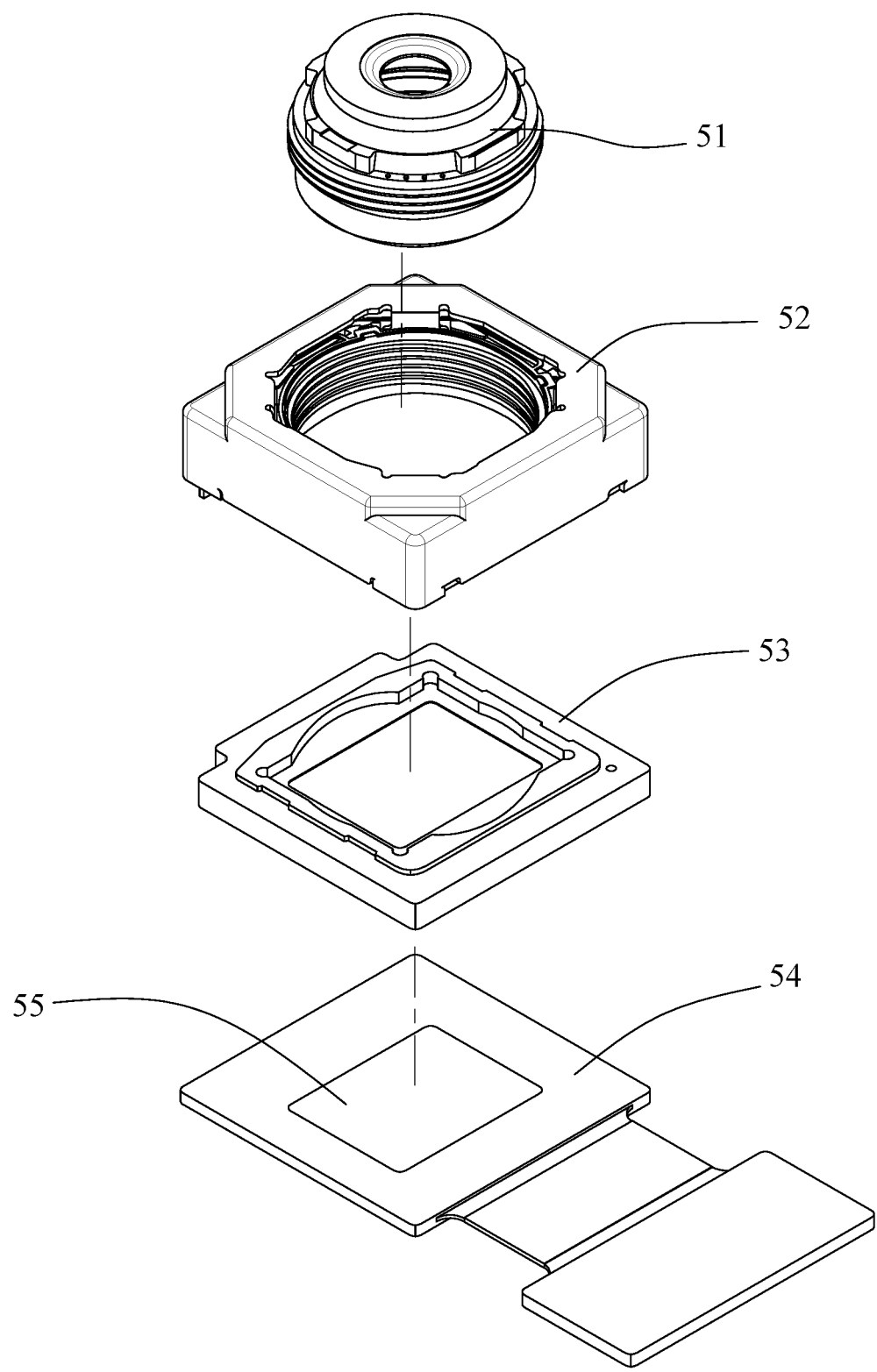
FIG. 6 is an exploded view of a camera module.

The method and structure of the present invention define a baseline reference plane 21 and an assembly baseline plane 22 on the module 2 and form at least three compensation baseline bumps 23 on the assembly baseline plane 22. However, the module 2 is not limited to a single item, and the baseline reference plane 21 and the assembly baseline plane 22 will also be adjusted according to processing requirements to ultimately ensure that the key components and other components can be accurately matched during assembly. In the following, the present invention will be applied to various components of a camera module, and will be described in different embodiments. As shown in FIG. 6, the camera module comprises a lens 51, a voice coil motor (VCM) 52, a bracket 53, a circuit board 54 and an image sensing chip 55, which is originally manufactured without using the method of the present invention, and then the components will be assembled with one another.

Figure 7A:
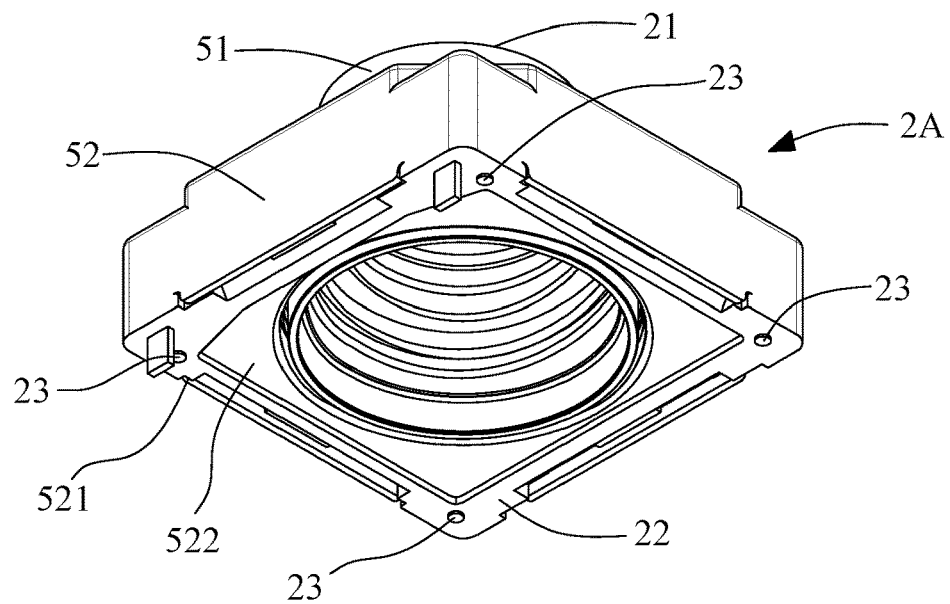
FIG. 7A is a first schematic view of the first embodiment of a camera module according to the present invention.
Figure 7B:
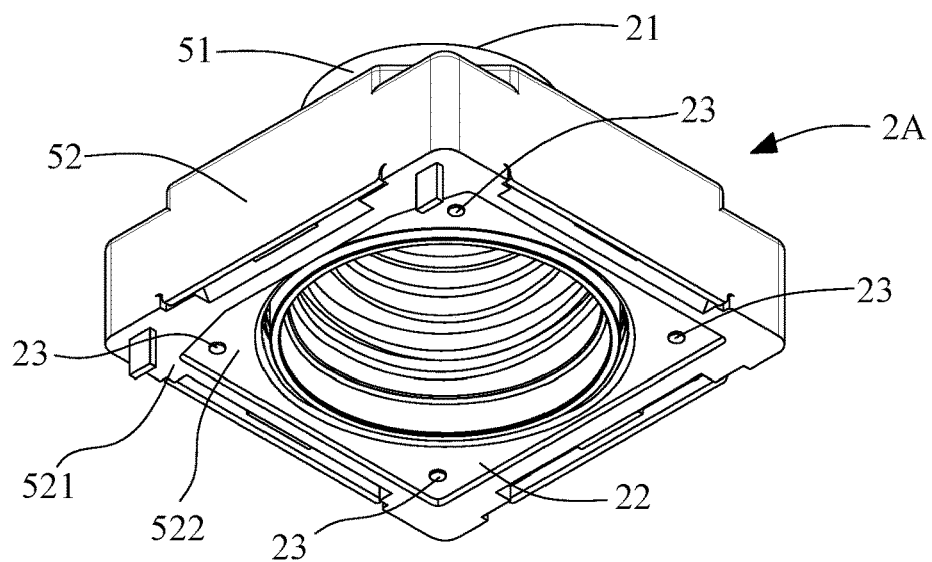
FIG. 7B is a second schematic view of the first embodiment of a camera module according to the present invention.

As shown in FIGS. 7A and 7B, the first embodiment of the present invention is applied to a camera module. In the present embodiment, the module 2A comprises a lens 51 and a voice coil motor 52. The baseline reference plane 21 is defined at the top plane of the lens 51. The bottom of voice coil motor 52 comprises an outer frame 521 and an inner frame 522. The assembly baseline plane 22 may be defined on the bottom plane of the outer frame 521 (as shown in FIG. 7A) or the bottom plane of the inner frame 522 (as shown in FIG. 7B). The compensation baseline bumps 23 are formed on the opposite assembly baseline plane 22 to compensate for the static inclination of the voice coil motor 52.

Figure 8A:
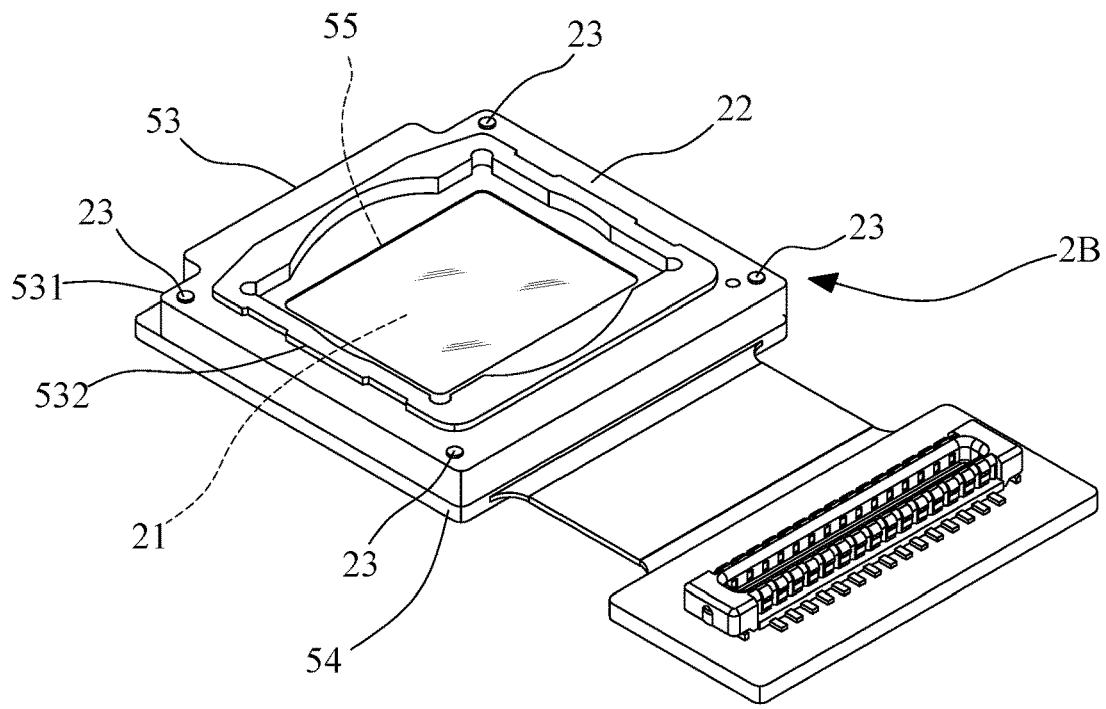
FIG. 8A is a first schematic view of the second embodiment of a camera module according to the present invention.
Figure 8B:
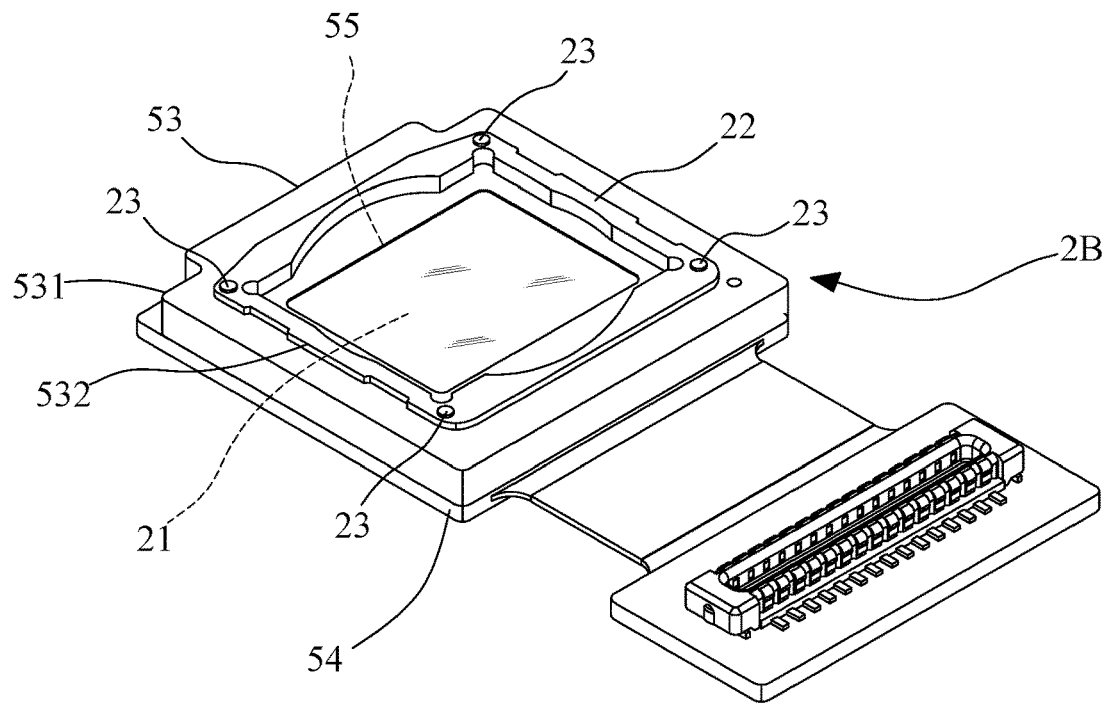
FIG. 8B is a second schematic view of the second embodiment of a camera module according to the present invention.

As shown in FIGS. 8A and 8B, the second embodiment of the present invention is applied to the camera module. In the present embodiment, the module 2B comprises a bracket 53, a circuit board 54, and an image sensing chip 55. The baseline reference plane 21 is defined on the top plane of the image sensing chip 55, and the top plane of the bracket 53 has an outer step 531 and an inner step 532 in a form of circular step. The assembly baseline plane 22 can be defined on the top plane of the outer step 531 (as shown in FIG. 8A) and the top plane of the inner step 532 (as shown in FIG. 8B). The compensation baseline bumps 23 are formed on the opposite assembly baseline surface 22 to compensate the inclination angle and distance between the assembly baseline plane 22 and the image sensing chip 55, so as to facilitate the precise alignment of subsequent components.

Figure 9A:
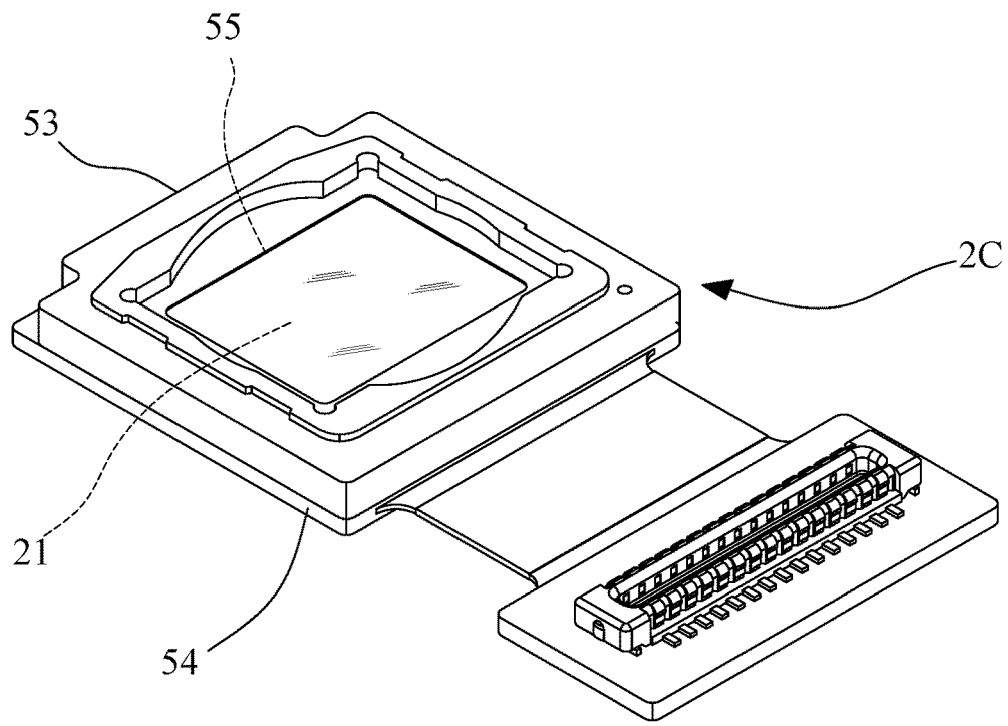
FIG. 9A is a first schematic view of the third embodiment of a camera module according to the present invention.
Figure 9B:
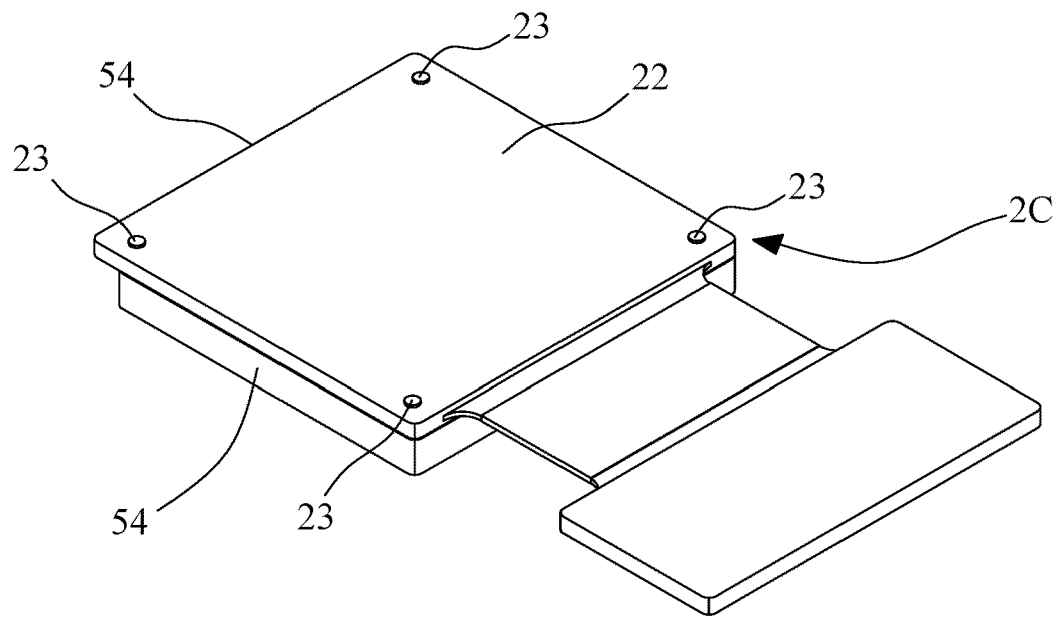
FIG. 9B is a second schematic view of the third embodiment of a camera module according to the present invention from a different angle.

As shown in FIGS. 9A and 9B, the third embodiment of the present invention is applied to a camera module. In the present embodiment, the module 2C comprises a bracket 53, a circuit board 54, and an image sensing chip 55. The baseline reference plane 21 is defined on the top plane of the image sensing chip 55. The assembly baseline plane 22 is defined on the bottom plane of the circuit board 54. The compensation baseline bumps 23 are formed on the assembly baseline surface 22 to align the module 2C with other modules in parallel when assembled.

Figure 10A:
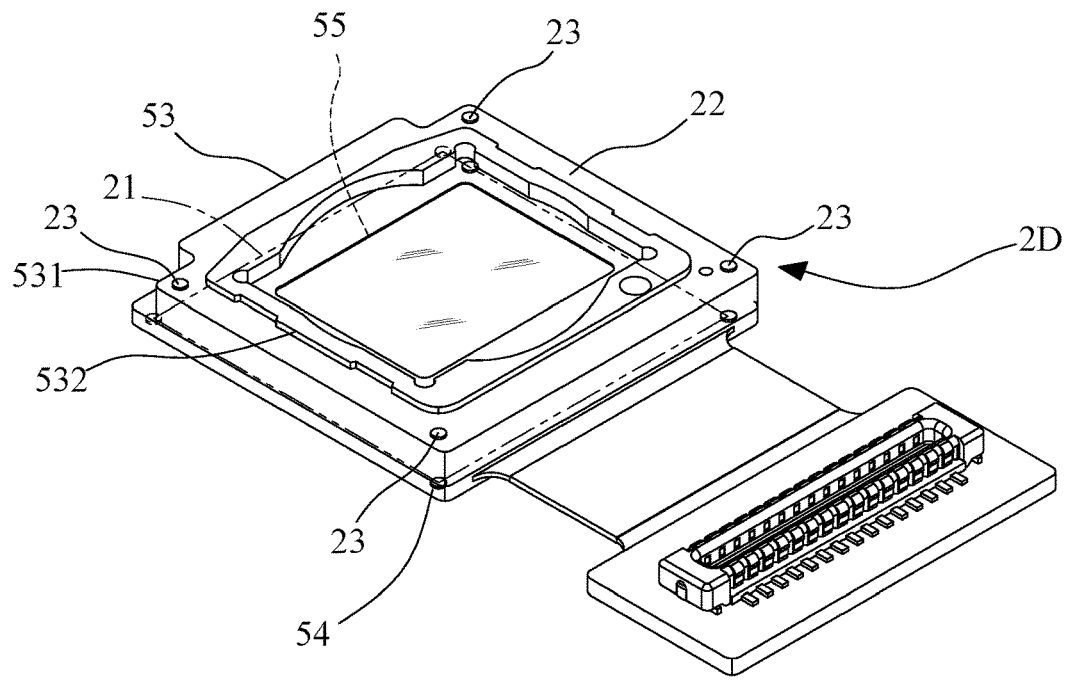
FIG. 10A is a first schematic view of the fourth embodiment of a camera module according to the present invention.
Figure 10B:
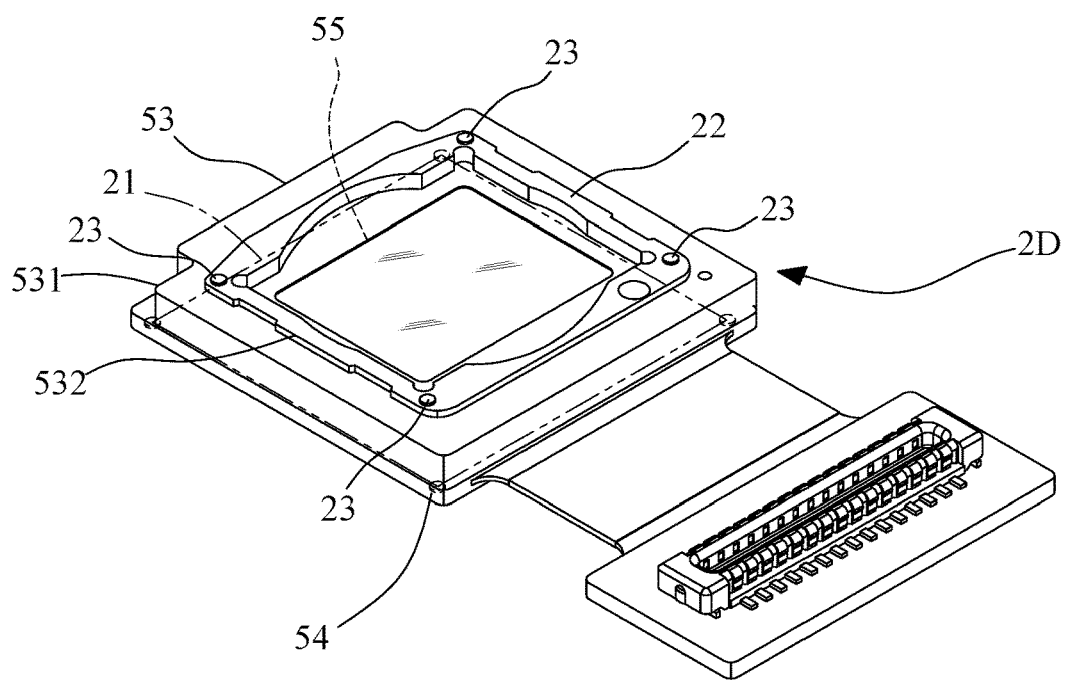
FIG. 10B is a second schematic view of the fourth embodiment of a camera module according to the present invention.

As shown in FIGS. 10A and 10B, the fourth embodiment of the present invention is applied to the camera module. In the present embodiment, the module 2D comprises a bracket 53, a circuit board 54, and an image sensing chip 55. The baseline reference plane 21 is defined on the baseline plane after the circuit board 54 has been compensated and calibrated. This baseline plane may adopt a position as shown in FIG. 9B. The top plane of the bracket 53 has an outer step 531 and an inner step 532 in a form of a circular step. The assembly baseline plane 22 can be defined on the top plane of the outer step 531 (as shown in FIG. 10A) and the top plane of the inner step 532 (as shown in FIG. 10B). The compensation baseline bumps 23 are formed on the corresponding assembly baseline surface 22 to serve as a baseline plane for assembly and joining.

Figure 11A:
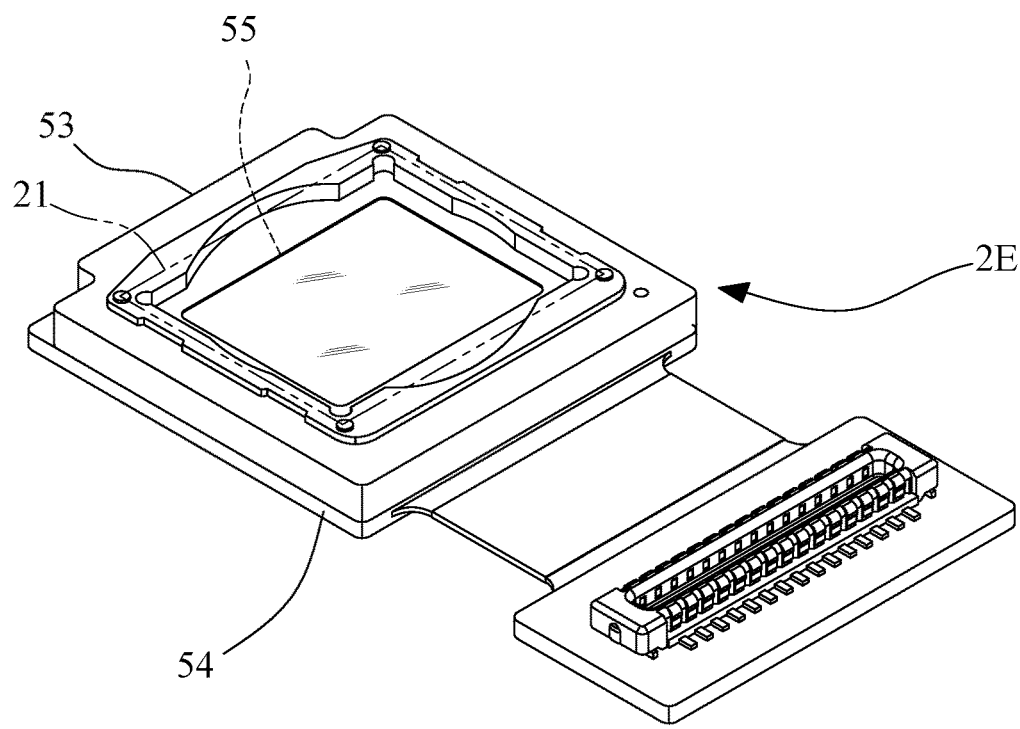
FIG. 11A is a first schematic view of the fifth embodiment of a camera module according to the present invention.
Figure 11B:
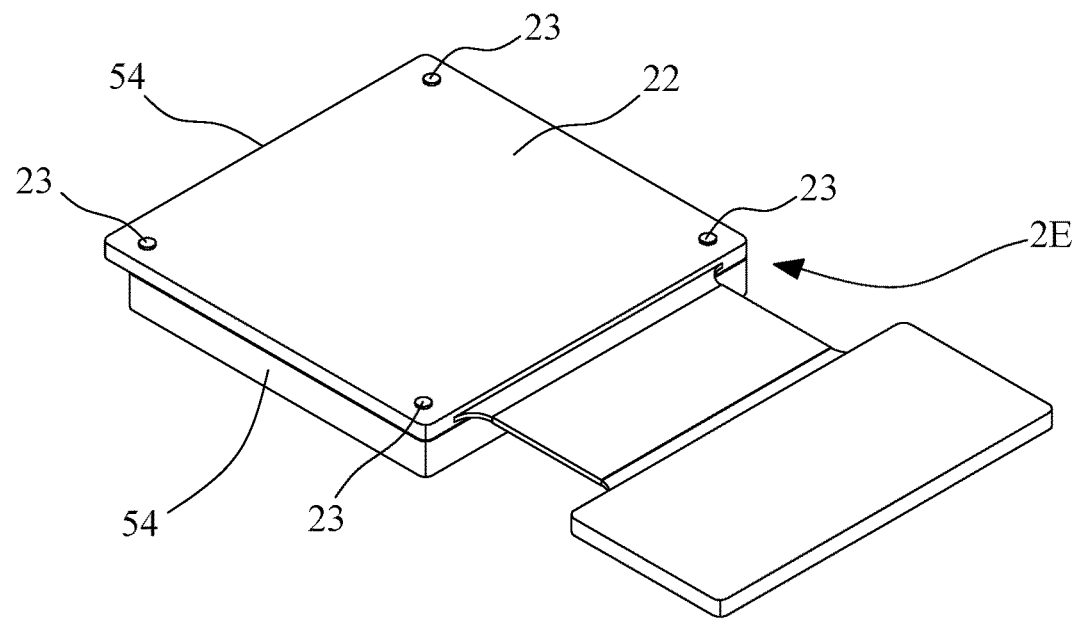
FIG. 11B is a second schematic view of the fifth embodiment of a camera module according to the present invention from a different angle.

As shown in FIGS. 11A and 11B, the fifth embodiment of the present invention is applied to a camera module. In the present embodiment, the module 2E comprises a bracket 53, a circuit board 54, and an image sensing chip 55. The baseline reference plane 21 is defined as a baseline plane after the bracket 53 has been calibrated and compensated. The baseline plane is shown in FIG. 8A or FIG. 8B. The assembly baseline plane 22 is defined on the bottom of the circuit board 54. The compensation baseline bumps 23 are formed on the assembly baseline surface 22 to align the module 2E with other modules in parallel when assembled.

In summary, the method and structure for compensating tolerances in assembling modules of the present invention are to form at least three compensation baseline bumps 23 on the assembly baseline plane 22 that was originally intended to be assembled with other components, and after calibration and compensation on the compensation baseline bumps 23, the plurality of the bump tops 231 forms a new preliminary baseline plane 24. Since the preliminary baseline plane 24 is parallel to the baseline reference plane 21 on the key component and the height is correct, the accuracy of subsequent assembly of the components can be ensured. The required equipment for assembly is simplified and the operation is easier and faster, and meets the requirements of patent application.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A method for compensating tolerances in assembling modules, applicable to a module and a pressing fixture, the module being provided with a baseline reference plane and an assembly baseline plane, the assembly baseline plane having at least three compensation baseline bumps, and the compensation baseline bumps having a height greater than a compensation amount; the pressing fixture being provided with a calibration reference plane; the method comprising: adjusting the position of the module or the pressing fixture to make the baseline reference plane parallel tithe calibration reference plane; the pressing fixture using the calibration reference plane to press on the compensation baseline bumps, and changing the position of a bump top of each compensation baseline bump; and removing the pressing fixture from the compensation baseline bumps, and the plurality of the bump tops forming a preliminary baseline plane, and the preliminary baseline plane being parallel to the baseline reference plane with a set distance in-between.

2. The method for compensating tolerances in assembling modules according to claim 1, wherein the compensation amount is an offset angle and a distance between the baseline reference plane and the assembly baseline plane.

3. The method for compensating tolerances in assembling modules according to claim 1, wherein the method further comprises a step of measuring an inclination angle or distance between the baseline reference plane and the calibration reference plane, and the timing for measurement is before adjusting the baseline reference plane and the calibration reference plane, or before pressing the calibration reference plane is pressed against the compensation baseline bump.

4. The method for compensating tolerances in assembling modules according to claim 1, wherein the compensation baseline bump is formed on the assembly baseline plane by way of dispensing glue, and the bump top of the compensation baseline bump that has not yet solidified is changed during the pressing process, and then the glue is cured.

5. The method for compensating tolerances in assembling modules according to claim 4, wherein the glue will only be fixed to the assembly baseline plane after curing and will not be fixed to the pressing fixture.

6. The method for compensating tolerances in assembling modules according to claim 1, wherein the compensation baseline bump is directly formed on the assembly baseline plane, and the pressing fixture is an ultrasonic pressurizing device or a hot press forming device; during the pressing process, the position of the bump top of each of the compensation baseline bumps is changed in an ultrasonic or hot pressing manner.

7. The method for compensating tolerances in assembling modules according to claim 1, wherein the plurality of the compensation baseline bumps is evenly distributed on the assembly baseline plane.

8. A structure for compensating tolerances in assembling modules, the module having a baseline reference plane and an assembly baseline plane, the assembly baseline plane having at least three compensation baseline bumps, each compensation baseline bump having a bump top and the plurality of the bump tops forming a preliminary baseline plane, and the preliminary baseline plane being parallel to the baseline reference plane with a set distance in-between.

* * * * *